United States Patent
Matsuzaki

(10) Patent No.: US 10,768,622 B2
(45) Date of Patent: Sep. 8, 2020

(54) AUTOMATIC TRAVELING WORK VEHICLE AND METHOD FOR MONITORING AUTOMATIC TRAVELING WORK VEHICLE

(71) Applicant: Kubota Corporation, Osaka-shi (JP)

(72) Inventor: Yushi Matsuzaki, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 314 days.

(21) Appl. No.: 15/838,358

(22) Filed: Dec. 12, 2017

(65) Prior Publication Data

US 2018/0173233 A1  Jun. 21, 2018

(30) Foreign Application Priority Data

Dec. 16, 2016 (JP) ................................. 2016-244522

(51) Int. Cl.
| | | |
|---|---|---|
| *G05D 1/00* | (2006.01) | |
| *A01B 69/04* | (2006.01) | |
| *G05D 1/02* | (2020.01) | |

(52) U.S. Cl.
CPC ......... *G05D 1/0088* (2013.01); *A01B 69/008* (2013.01); *G05D 1/0212* (2013.01); *G05D 2201/0201* (2013.01)

(58) Field of Classification Search
CPC .............. G05D 1/0088; G05D 1/0212; G05D 2201/0201; G05D 1/02; G05D 1/08; A01B 69/008; A01B 69/00
See application file for complete search history.

(56) References Cited

U.S. PATENT DOCUMENTS

| | | | |
|---|---|---|---|
| 2006/0282205 A1* | 12/2006 | Lange .................. | A01B 69/008 701/50 |
| 2015/0351320 A1 | 12/2015 | Takahara et al. | |
| 2016/0031447 A1 | 2/2016 | Kobayashi et al. | |
| 2016/0037707 A1* | 2/2016 | Bebernes ............. | A01B 69/007 180/6.48 |
| 2018/0107212 A1* | 4/2018 | Baumgaertner ..... | G05D 1/0055 |

FOREIGN PATENT DOCUMENTS

| | | |
|---|---|---|
| JP | 2014-138570 | 7/2014 |
| JP | 2016-034238 | 3/2016 |

* cited by examiner

*Primary Examiner* — Alan D Hutchinson
(74) *Attorney, Agent, or Firm* — Mori & Ward, LLP

(57) ABSTRACT

An automatic traveling work vehicle includes position calculation circuitry, actual work command generation circuitry, work control circuitry, virtual work command generation circuitry, and monitoring circuitry. The actual work command generation circuitry is configured to generate an actual work command in accordance with a position of the automatic traveling work vehicle. The work control circuitry is configured to control the automatic traveling work vehicle to work at the position according to the actual work command. The virtual work command generation circuitry is configured to generate a virtual work command in accordance with the position of the automatic traveling work vehicle, the automatic traveling work vehicle being not actually controlled according to the virtual work command. The monitoring circuitry is configured to determine whether an abnormality occurs in an operation of the automatic traveling work vehicle based on the actual work command and the virtual work command.

7 Claims, 4 Drawing Sheets

AUTOMATIC TRAVELING WORK VEHICLE AND METHOD FOR MONITORING AUTOMATIC TRAVELING WORK VEHICLE

CROSS-REFERENCE TO RELATED APPLICATIONS

The present application claims priority under 35 U.S.C. § 119 to Japanese Patent Application No. 2016-244522, filed Dec. 16, 2016. The contents of this application are incorporated herein by reference in its entirety.

BACKGROUND OF THE INVENTION

Field of the Invention

The present invention relates to an automatic traveling work vehicle, and a method for monitoring an automatic traveling work vehicle.

Discussion of the Background

Japanese Patent Application Laid-open No. 2014-138570 discloses an agricultural work machine that can work in various operation modes. The agricultural work machine downloads agricultural work information to classify a target agricultural work, compares a set setting work mode to a registration work mode included in the downloaded agricultural work information, and displays a comparison result on a display. Based on the comparison result displayed on the display, an operator can easily and surely recognize whether a work mode currently set to the agricultural work machine agrees with a work mode previously registered in a management center. The work mode includes setting parameters, such as an orientation of a work device and a travel speed, of the work machine defined to perform various operations, and use of the correct work mode allows the work as planned to be performed.

In order to reduce a burden on a driver in the work traveling, Japanese Patent Application Laid-open No. 2016-034238 discloses a driving support system, in which the content of a series of operations performed by manual operation during work traveling is recorded and then the recorded content of the operations is reproduced to automatically perform the content of the series of operations. The driving support system includes: a device controlling unit that outputs an operation control signal to a traveling unit that causes a traveling vehicle body to travel and a work operation device that causes the ground work device to perform an operation; a recording unit that records control data corresponding to the operation control signal as a work traveling sequence in order of execution processes; a reproducing unit that reads the control data recorded in the recording unit and provides the control data to the device controlling unit; a screen processing unit that displays a work traveling sequence screen, on which icons converted from the control data in each execution process unit are displayed in the order of the execution processes, on the display; and a plural-work traveling management unit that manages a plurality of the work traveling sequences on the same work traveling sequence screen.

SUMMARY OF THE INVENTION

According to one aspect of the present invention, an automatic traveling work vehicle includes position calculation circuitry, actual work command generation circuitry, work control circuitry, virtual work command generation circuitry, and monitoring circuitry. The position calculation circuitry is configured to calculate a position of the automatic traveling work vehicle based on positioning data from a satellite positioning module. The actual work command generation circuitry is configured to generate an actual work command in accordance with the position of the automatic traveling work vehicle. The work control circuitry is configured to control the automatic traveling work vehicle to work at the position according to the actual work command. The virtual work command generation circuitry is configured to generate a virtual work command in accordance with the position of the automatic traveling work vehicle, the automatic traveling work vehicle being not actually controlled according to the virtual work command. The monitoring circuitry is configured to determine whether an abnormality occurs in an operation of the automatic traveling work vehicle based on the actual work command and the virtual work command.

According to another aspect of the present invention, an automatic traveling work vehicle includes position calculation means, actual work command generation means, work control means, virtual work command generation means, and monitoring means. The position calculation means are for calculating a position of the automatic traveling work vehicle based on positioning data from a satellite positioning module. The actual work command generation means are for generating an actual work command in accordance with the position of the automatic traveling work vehicle. The work control means are for controlling the automatic traveling work vehicle to work at the position according to the actual work command. The virtual work command generation means are for generating a virtual work command in accordance with the position of the automatic traveling work vehicle, the automatic traveling work vehicle being not actually controlled according to the virtual work command. The monitoring means are for determining whether an abnormality occurs in an operation of the automatic traveling work vehicle based on the actual work command and the virtual work command.

According to a further aspect of the present invention, a method for monitoring an automatic traveling work vehicle includes calculating a position of the automatic traveling work vehicle based on positioning data from a satellite positioning module, generating an actual work command in accordance with the position of the automatic traveling work vehicle, controlling the automatic traveling work vehicle to work at the position according to the actual work command, generating a virtual work command in accordance with the position of the automatic traveling work vehicle, the automatic traveling work vehicle being not actually controlled according to the virtual work command, and determining whether an abnormality occurs in an operation of the automatic traveling work vehicle based on the actual work command and the virtual work command.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
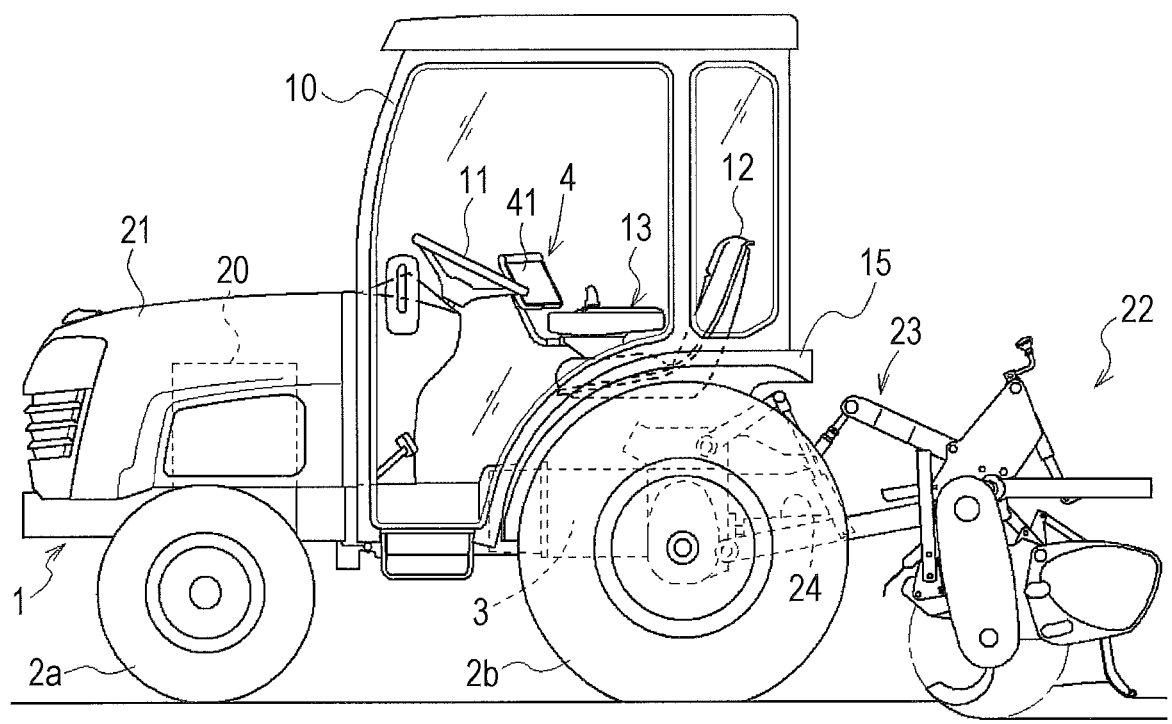
FIG. 1 is a side view of a tractor that is an automatic traveling work vehicle according to an exemplary embodiment.

The embodiments will now be described with reference to the accompanying drawings, wherein like reference numerals designate corresponding or identical elements throughout the various drawings.

A tractor for agricultural work is cited as an automatic traveling work vehicle according to an exemplary embodiment of the present invention. FIG. 1 is a side view of the tractor. In the tractor, an engine 20 is mounted on a front portion of a vehicle body 1 of the tractor supported by front wheels 2a and rear wheels 2b, and a transmission 3 is mounted behind the engine 20. A tilling device 22 is liftably mounted on a rear portion of the vehicle body 1 with a lifting mechanism 23 interposed therebetween. The tractor is of a four-wheel drive type, and power of the engine 20 is transmitted to the front wheels 2a and the rear wheels 2b, which can function as a drive wheel, through a transmission mechanism incorporated in the transmission 3. The power of the engine 20 is also transmitted to the tilling device 22 though a PTO shaft 24 protruding rearward from the transmission 3. The engine 20 is covered with a hood 21. A cabin 10 is supported on the vehicle body 1 behind the hood 21 and above the transmission 3.

An interior of the cabin 10 functions as a driving space, a steering wheel 11 that performs steering operation of the front wheels 2a though a steering mechanism (not illustrated) is disposed in a front portion of the cabin 10, and a driver's seat 12 is disposed between a pair of right and left rear fenders 15 in a rear portion of the cabin 10. An armrest operation device 13 having various operation tools is provided from the side to the front of the driver's seat 12. A data processing terminal with an input and output portion that includes a first controlling unit 4 is disposed in front of the armrest operation device 13. The data processing terminal (first controlling unit 4) is a tablet computer, is provided with a touch panel 41, can receive various operation inputs by the driver, and can notify the driver of various pieces of information.

Although not illustrated, a control lever that raises and lowers the tilling device 22 through the operation of the lifting mechanism 23, a shift lever that switches gears in the transmission 3, a drive mode switching lever that switches between 4 WD and 2 WD, and an engine speed adjustment lever that adjusts the engine speed are disposed in the armrest operation device 13.

Figure 2:
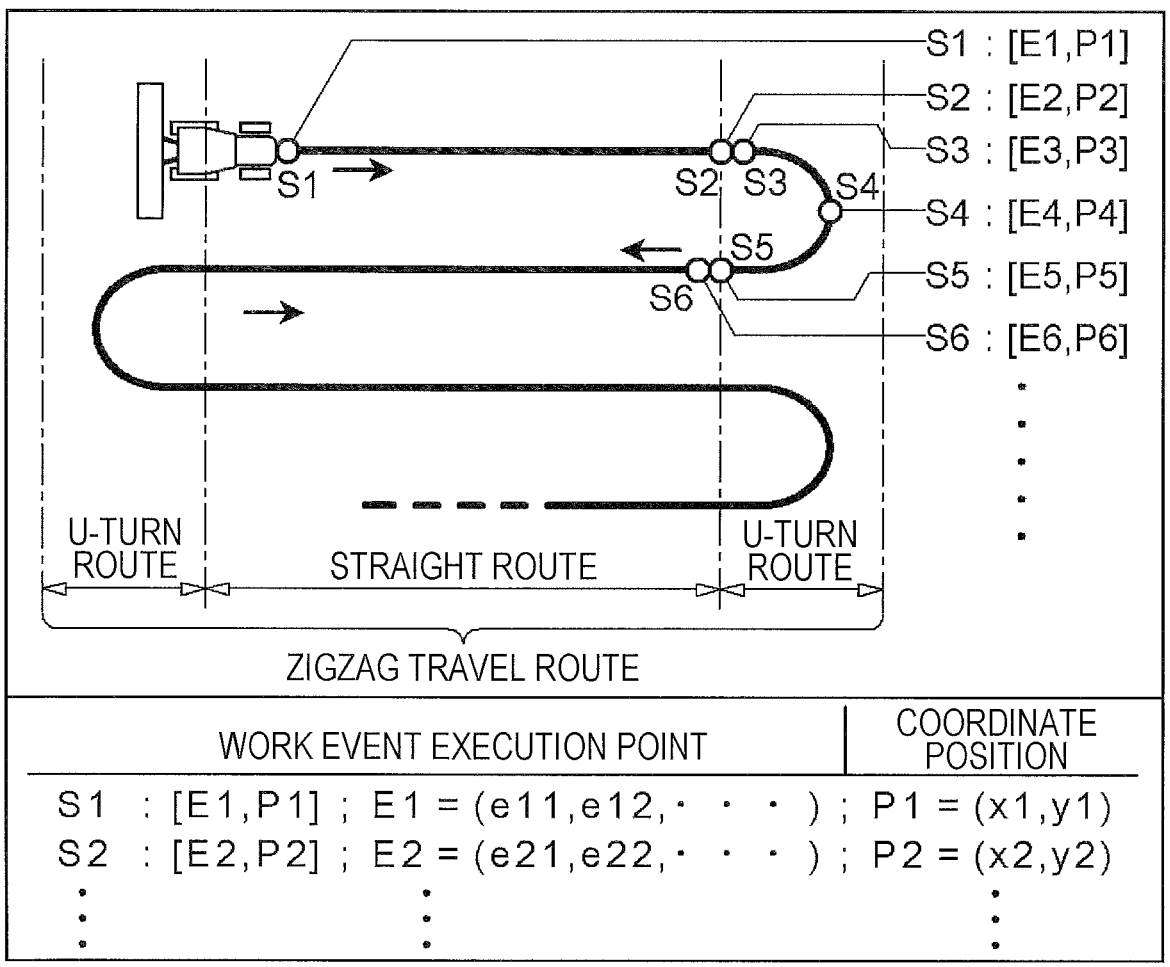
FIG. 2 is an explanatory diagram illustrating a travel route and a work event allocated to the travel route.

FIG. 2 schematically illustrates an example of work traveling performed by the tractor. In the example of FIG. 2, the travel route in which the tractor automatically travels is a zigzag travel route including a plurality of straight routes and a U-turn route connecting the straight routes. In the travel route, when the tractor travels along the straight route, tilling work is performed by lowering the tilling device 22 (one example of the work event). When the tractor travels along the U-turn route, the tilling work is stopped by raising the tilling device 22, and the traveling is performed while the tilling work is stopped (one example of the work event). A direction of the vehicle body 1 is changed by taking in U-turn traveling in which steering control is used or switch back traveling in which reverse is used (one example of the work event).

In the example of FIG. 2, a work event planning point (indicated by S1, S2, ... in FIG. 2) is set along the planned travel route. A work event (indicated by E1, E2, ... in FIG. 2) performed at each work event planning point and a position on a map (indicated by P1, P2, ... in FIG. 2) are allocated to each work event planning point. The work event includes a parameter (indicated by e11, e12, ... in FIG. 2) determining an operation state (such as a vehicle speed, a gear position, and a steering angle) of the vehicle body 1 or an operation state (such as a tilling depth and a raised position) of the tilling device 22, and a specific work event is performed based on the parameter. The position on the map is represented by a coordinate position (indicated by (x1, y1), (x2, y2), ... in FIG. 2).

Figure 3:
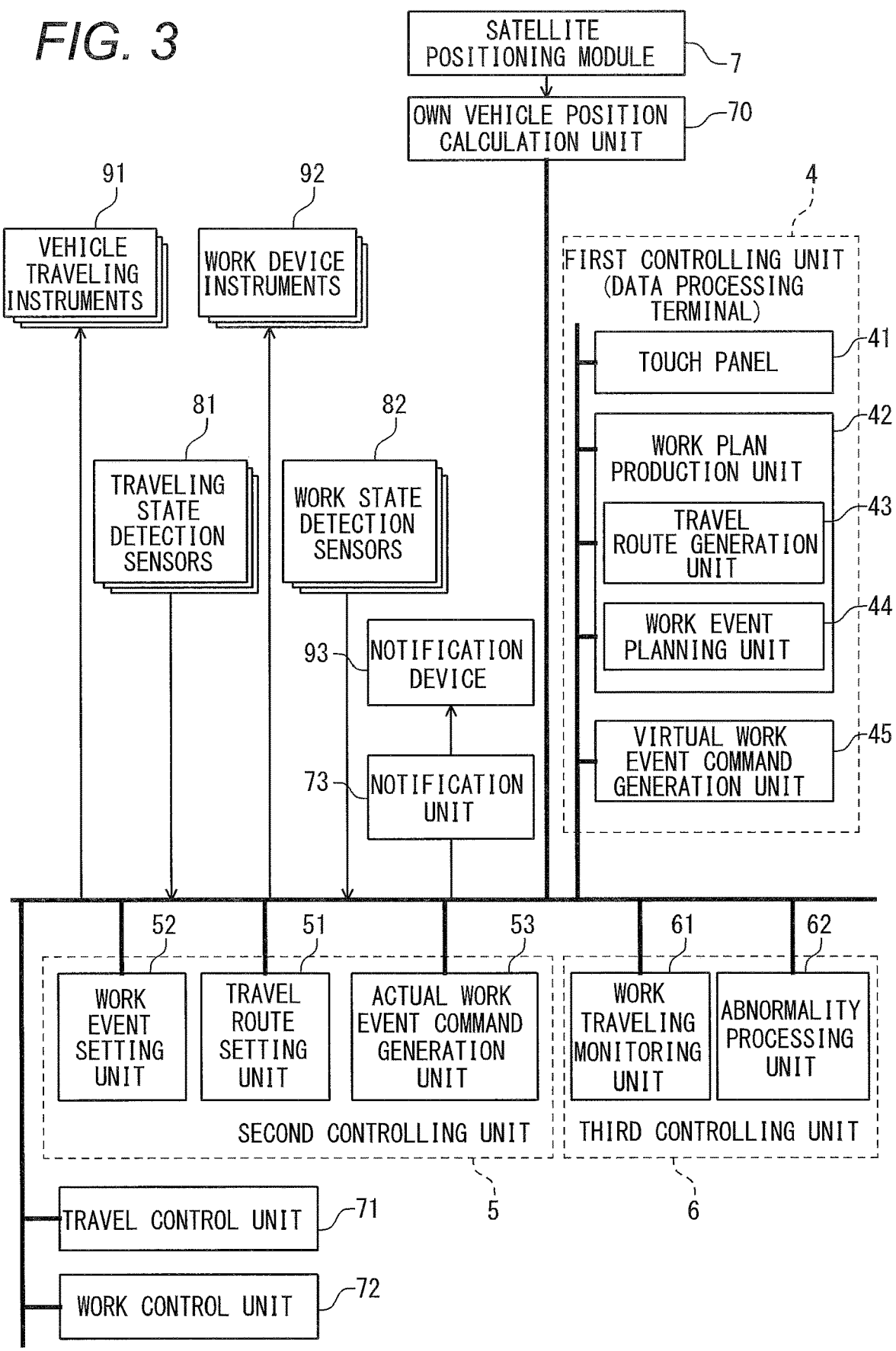
FIG. 3 shows a structure of a control system of the tractor.

FIG. 3 shows a structure of a control system of the tractor. As illustrated in FIG. 3, a control system of the tractor includes a first controlling unit (data processing terminal) 4, a second controlling unit 5, and a third controlling unit 6, which are particularly related to the control of the work traveling monitoring of the present invention. Although the first controlling unit 4, the second controlling unit 5, and the third controlling unit 6 are connected to one another through an in-vehicle LAN, the first controlling unit 4, the second controlling unit 5, and the third controlling unit 6 can be operated independently of one another, and configured such that a trouble occurring in one control unit does not affect another controlling unit.

A structure of a control system of a normal tractor will be described. In the control system in FIG. 3, units are connected to one another through a data and signal line (such as an in-vehicle LAN and a control signal line) indicated by a solid line such that data can be exchanged. However, an output processing unit, an input processing unit, and a communication unit, which examples of an input and output interface, are omitted in FIG. 3. The data and signal line is connected to vehicle traveling instruments 91 including operation devices for the engine 20, the transmission 3, and the steering mechanism, to work device instruments 92 including operation devices for the tilling device 22 and the lifting mechanism 23, and to a notification device 93 including a buzzer, a speaker, and a lamp. The data and signal line is connected to an own vehicle position calculation unit 70, traveling state detection sensors 81, and work state detection sensors 82. The own vehicle position calculation unit 70 calculates a coordinate position on the map of the vehicle body 1 based on positioning data from a satellite positioning module 7 in which GPS is used.

The data and signal line is also connected to a travel control unit (travel control circuitry) 71 and a work control unit (work control circuitry) 72. The travel control unit 71 has automatic traveling control circuitry and a manual traveling control circuitry. When the automatic traveling control circuitry operates, a control signal generated based on the own vehicle position from the own vehicle position calculation unit (position calculation circuitry) 70 and the set travel route is outputted to the steering mechanism, and the automatic traveling is performed along the travel route. When the manual traveling control circuitry operates, the manual traveling is performed based on the operation of the steering wheel 11 by a driver. Similarly, the work control unit 72 also has automatic work control circuitry to automatically operate the tilling device 22 and the lifting mechanism 23 based on the above work event, and manual work control circuitry using various operation tools.

The first controlling unit 4 is configured as a data processing terminal using a tablet computer. The first controlling unit 4 includes the touch panel 41, a work plan production unit 42, and a virtual work event command generation unit (virtual work command generation circuitry) 45, which are particularly related to the present invention, and the work plan production unit 42 includes a travel route generation unit (route generation circuitry) 43 and a work event planning unit (work planning circuitry) 44.

The work plan production unit 42 produces, using the touch panel 41, a plan in which the tractor performs the work traveling along the travel route in the field. However, in the case that a work plan is previously produced, the work plan can also be received through communication or a storage media. The travel route generation unit 43 refers to field information including a landform of the field to be worked, and generates the travel route using a previously-installed travel route generation program. The work event planning unit 44 generates a work event plan that defines the work event performed during the work traveling along the travel route. FIG. 2 schematically illustrates a content of the work event plan. Based on the travel route, the work event plan, and the own vehicle position, when the own vehicle position reaches a coordinate position that is a predetermined work event planning point (actually, timing before the own vehicle position reaches the coordinate position), the virtual work event command generation unit 45 generates a virtual work event command to perform the work event.

The second controlling unit 5 includes a travel route setting unit 51, a work event setting unit 52, and an actual work event command generation unit (actual work command generation circuitry) 53. The travel route setting unit 51 sets the travel route generated by the travel route generation unit 43 as a target travel route, readably develops the travel route in a memory, and provides the travel route to the travel control unit 71. The work event setting unit 52 develops the work event described in the work event plan generated by the work event planning unit 44 and the coordinate position at which the work event is performed, in the memory in a readable form. Based on the work event plan developed in the memory, the travel route set by the travel route setting unit 51, and the own vehicle position from the own vehicle position calculation unit 70, the actual work event command generation unit 53 generates an actual work event command to perform a predetermined work event. The generated actual work event command is transferred to the work control unit 72.

The third controlling unit 6 includes a work traveling monitoring unit (monitoring circuitry) 61 and an abnormality processing unit 62. The work traveling monitoring unit 61 compares the actual work event command generated by the work event command generation unit 53 to the virtual work event command generated by the virtual work event command generation unit 45 at an arbitrary time, time the own vehicle position reaches the work event planning point, or time either the actual work event command or the virtual work event command is output, and the work traveling monitoring unit 61 determines that the abnormality is generated in the work traveling when the actual work event command and the virtual work event command do not correspond to each other or when the actual work event command and the virtual work event command cannot be compared to each other. The discrepancy between the actual work event command and the virtual work event command indicates that the parameters (indicated by e 11, e 12, . . . In FIG. 2) included in the work events do not correspond to each other or that execution times deviate from each other. The abnormality processing unit 62 performs the abnormality process according to the content of an abnormality when the work traveling monitoring unit 61 determines the abnormality. The abnormality process includes emergency stop of the vehicle body 1 and notification through a notification device 93.

Figure 4:
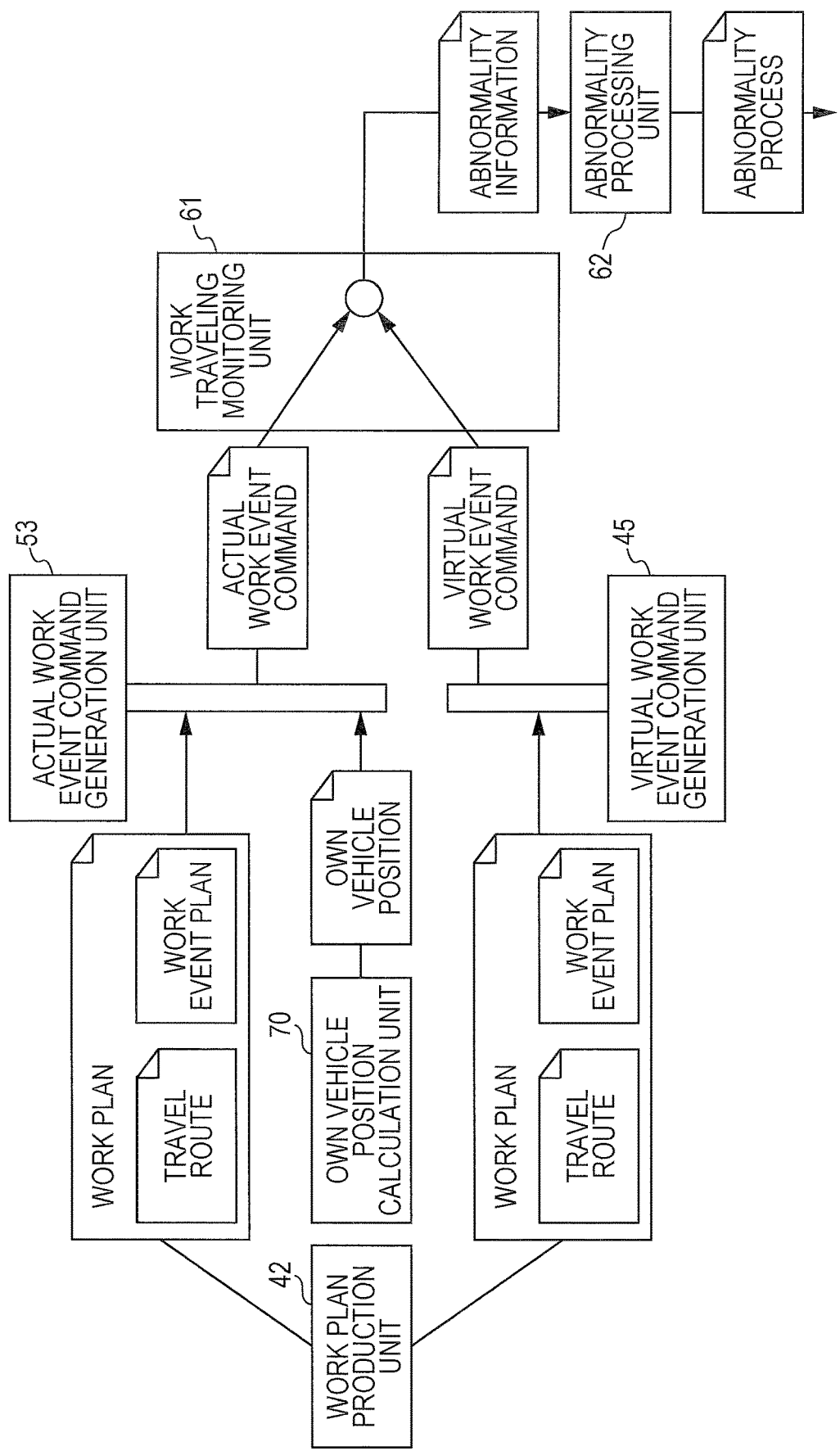
FIG. 4 is an explanatory diagram illustrating a flow of control of work traveling monitoring.

An example of a flow of control of the work traveling monitoring in the control system of the tractor will be described below with reference to FIG. 4.

Based on operation input by the user using the graphic user interface of the first controlling unit 4, the work plan production unit 42 produces the work plan of the field that becomes a work target. The produced work plan includes the travel route for work traveling generated by the travel route generation unit 43 and the work event plan generated by the work event planning unit 44.

The produced work plan is transmitted to the virtual work event command generation unit 45 and the actual work event command generation unit 53. Although not illustrated in FIG. 4, the travel route included in the work plan is transmitted to the travel route setting unit 51.

When the work traveling is started, the virtual work event command generation unit 45 and the actual work event command generation unit 53 sequentially receive the own vehicle position from the own vehicle position calculation unit 70. The actual work event command generation unit 53 extracts the work event having the coordinate position that agrees substantially with the received own vehicle position, and generates the actual work event command to perform the content of the work event. The generated actual work event command is provided to the work traveling monitoring unit 61, the travel control unit 71, and the work control unit 72. Similarly, the virtual work event command generation unit 45 extracts the work event having the coordinate position that agrees substantially with the received own vehicle position, and generates the virtual work event command based on the content of the work event. The generated virtual work event command is provided to the work traveling monitoring unit 61. The work traveling monitoring unit 61 compares the received actual work event command to the received virtual work event command. When the received actual work event command and the received virtual work event command do not correspond to each other, the work traveling monitoring unit 61 determines that the abnormality is generated in the work traveling, and outputs abnormality information. Even when only one of the actual work event command and the virtual work event command is received, the work traveling monitoring unit 61 determines that the abnormality is generated in the work traveling, and outputs the abnormality information. According to the content of the abnormality information, the abnormality processing unit 62 performs an abnormality process to recover the abnormality. The abnormality process includes stop of the vehicle body 1, stop of the tilling device 22, a forced change from automatic operation to the manual operation, and a warning through the notification device 93 operated by the control signal from the notification unit 73.

When either the virtual work event command or the real work event command is output at the time the own vehicle position is not received from the own vehicle position calculation unit 70, the abnormality can be determined based on whether both the actual work event command and the virtual work event command are output or the comparison of the contents of the actual work event command and the virtual work event command to each other.

Other Exemplary Embodiments (1) In the above exemplary embodiment, the tractor equipped with the tilling device 22 has been described as the work vehicle. However, the present invention is also applicable to a tractor equipped with a working device other than the tilling device 22, agricultural work machines such as a combine and a rice transplanter, and a construction machine.

(2) In the above exemplary embodiment, the first controlling unit 4, the second controlling unit 5, and the third controlling unit 6 are connected to one another through the in-vehicle LAN, and included in the tractor. Alternatively, the first controlling unit 4 that is the data processing terminal may be configured to be carried by a manager and to wirelessly exchange data with the control system of the tractor. Additionally, the first controlling unit 4 may be constructed as a management computer at a remote place, and connected to the control system of the tractor through the Internet.

(3) The division of each unit in the structure shown in FIG. 3 is an example for the purpose of easy understanding. Various units may be integrated, or a single unit may be divided into a plurality of sub units. For example, the first controlling unit 4, the second controlling unit 5, and the third controlling unit 6 may include a processor to execute a program to perform a function of each unit (circuitry) of the first controlling unit 4, the second controlling unit 5, and the third controlling unit 6, respectively. In addition, the first controlling unit 4, the second controlling unit 5, and the third controlling unit 6 may include two or more processors for the units thereof.

The embodiment can be applied to the automatic traveling work vehicle that performs the work traveling along the travel route.

According to the embodiment, an automatic traveling work vehicle to perform work traveling along a travel route includes: an own vehicle position calculation unit to calculate an own vehicle position based on positioning data from a satellite positioning module; a travel route generation unit to generate the travel route; a work event planning unit to generate a work event plan defining a work event performed during the work traveling; a travel control unit to control automatic traveling along the travel route; an actual work event command generation unit to generate an actual work event command based on the travel route, the work event plan, and the own vehicle position; a virtual work event command generation unit to generate a virtual work event command based on the travel route, the work event plan, and the own vehicle position; a work control unit to control execution of the work event based on the actual work event command; and a work traveling monitoring unit to determine an abnormality of the work traveling based on the actual work event command and the virtual work event command.

The term of "work traveling" used in the present application includes performing the work during the traveling, only traveling, only performing the work, performing at least one of the items, and a pause of the traveling work.

According to the configuration, the actual work event command is generated by actually operating the device in order to yield the work event (such as a change of a vehicle speed, a change of a direction of the vehicle body, and a change of an orientation of the work device) defined in the work event plan, and the virtual work event command is generated as a dummy by a system separated from the generation of the actual work event command. Accordingly, when the work vehicle reaches the work event planning point where the execution of the predetermined work event is planned while performing the automatic traveling along the predetermined travel route, the work traveling monitoring unit checks the actual work event command and virtual work event command for the work event. When the extracted actual work event command and virtual work event command are output at the substantially same timing, and when the extracted actual work event command and virtual work event command have the same work event content, the work traveling is determined to be normal. Otherwise, it can be determined that the abnormality is generated in the work traveling. When the virtual work event command is not output at the time the actual work event command is output, it can be determined that the abnormality is generated in a sensor, an operation device, a signal line, or a data line, which is used to perform the work event. There are many work events to be performed during the work traveling along the travel route, and whether the actual work event command is correct is checked in the time each work event is performed. Therefore, any abnormality can quickly be detected on the work traveling, and recovery from abnormality generation can be performed at an early stage.

In an advantageous exemplary embodiment of the present invention, in the automatic traveling work vehicle, a first controlling unit includes the travel route generation unit, the work event planning unit, and the virtual work event command generation unit. A second controlling unit includes the actual work event command generation unit. A third controlling unit includes the work traveling monitoring unit. The first controlling unit, the second controlling unit, and the third controlling unit are constructed as an independent control system. Therefore, even if a trouble such as a communication failure of the signal or the data is generated, the trouble is limited only to the controlling unit in which the communication failure is generated, so that monitoring reliability of the work event by the work traveling monitoring unit is enhanced.

In an advantageous exemplary embodiment of the present invention, in the automatic traveling work vehicle, the first controlling unit is configured as a data processing terminal equipped with a touch panel and having an input and output function. In the first controlling unit, not only functional units, such as a travel route generation unit and the work event planning unit, which require the operation of the user, are constructed, but also a data capacity related to the travel route and the work event is increased in a large-scale work traveling. Therefore, a large calculation capability is required to perform the functions of the travel route generation unit and the work event planning unit. Therefore, the data processing terminal with the input and output function having the high-level user interface and high calculation capability is usefully used as the first controlling unit unlike other controlling units.

In an advantageous exemplary embodiment of the present invention, in the automatic traveling work vehicle, the work traveling monitoring unit compares the actual work event command related to the work event with the virtual work event command when the automatic traveling work vehicle travels along the travel route to which the work event is allocated, and the work traveling monitoring unit determines the abnormality of the work traveling when the actual work event command and the virtual work event command do not correspond to each other. When the actual work event command and the virtual work event command do not correspond to each other in terms of the content or timing, the control system fails but the work traveling is not performed as planned, so that it is determined that the abnormality is generated in the work traveling. Because the abnormality is considered to be caused by a communication error of the data or signal, a failure of a sensor, or a failure of various work traveling devices, the abnormality process including stop of work traveling is performed.

Obviously, numerous modifications and variations of the present invention are possible in light of the above teachings. It is therefore to be understood that within the scope of the appended claims, the invention may be practiced otherwise than as specifically described herein.

What is claimed is:

1. An automatic traveling work vehicle, comprising:
    position calculation circuitry configured to calculate positions of the automatic traveling work vehicle based on positioning data from a satellite positioning module;
    actual work command generation circuitry configured to generate an actual work command to perform a work event at a work position among the positions of the automatic traveling work vehicle;
    work control circuitry configured to control the automatic traveling work vehicle to work at the work position according to the actual work command;
    virtual work command generation circuitry configured to generate a virtual work command in accordance with the work event at the work position, the automatic traveling work vehicle being not actually controlled according to the virtual work command; and
    monitoring circuitry configured to determine whether an abnormality occurs in an operation of the automatic traveling work vehicle based on the actual work command and the virtual work command.

2. The automatic traveling work vehicle according to claim 1, further comprising:
    route generation circuitry configured to generate a travel route;
    travel control circuitry configured to control automatic traveling of the automatic traveling work vehicle along the travel route; and
    work planning circuitry configured to generate a work plan defining a work to be performed during the automatic traveling.

3. The automatic traveling work vehicle according to claim 2, further comprising:
    a first controlling unit including the route generation circuitry, the work planning circuitry, and the virtual work command generation circuitry;
    a second controlling unit including the actual work command generation circuitry; and
    a third controlling unit including the monitoring circuitry,
    wherein the first controlling unit, the second controlling unit, and the third controlling unit independently operate.

4. The automatic traveling work vehicle according to claim 3, wherein the first controlling unit includes a data processing terminal equipped with a touch panel.

5. The automatic traveling work vehicle according to claim 1,
    wherein the monitoring circuitry is configured to compare the actual work command with the virtual work command when the automatic traveling work vehicle travels along a travel route, and
    wherein the monitoring circuitry is configured to determine the abnormality in the operation of the automatic traveling work vehicle when the actual work command and the virtual work command do not correspond to each other.

6. An automatic traveling work vehicle, comprising:
    position calculation means for calculating positions of the automatic traveling work vehicle based on positioning data from a satellite positioning module;
    actual work command generation means for generating an actual work command to perform a work event at a work position among the positions of the automatic traveling work vehicle;
    work control means for controlling the automatic traveling work vehicle to work at the work position according to the actual work command;
    virtual work command generation means for generating a virtual work command in accordance with the work event at the work position, the automatic traveling work vehicle being not actually controlled according to the virtual work command; and
    monitoring means for determining whether an abnormality occurs in an operation of the automatic traveling work vehicle based on the actual work command and the virtual work command.

7. A method for monitoring an automatic traveling work vehicle, comprising:
    calculating positions of the automatic traveling work vehicle based on positioning data from a satellite positioning module;
    generating an actual work command to perform a work event at a work position among the positions of the automatic traveling work vehicle;
    controlling the automatic traveling work vehicle to work at the work position according to the actual work command;
    generating a virtual work command in accordance with the work event at the work position, the automatic traveling work vehicle being not actually controlled according to the virtual work command; and
    determining whether an abnormality occurs in an operation of the automatic traveling work vehicle based on the actual work command and the virtual work command.

* * * * *